3,297,732
PROCESS FOR PREPARING ORGANOTIN HALIDES
Clarence K. Banks, Westfield, N.J., assignor to M & T Chemicals Inc., New York, N.Y., a corporation of Delaware
No Drawing. Filed July 25, 1963, Ser. No. 297,684
24 Claims. (Cl. 260—429.7)

This invention relates to the production of organotin compounds. More specifically, it relates to a novel process for producing these compounds.

As is well known to those skilled in the art, organotin compounds, typically butyltin halides, may be prepared from tin tetrachloride and tetrabutyltin by the following illustrative reaction:

$$3(C_4H_9)_4Sn + SnCl_4 \rightarrow 4(C_4H_9)_3SnCl$$

Although this reaction may proceed at temperatures of 200° C. or higher for 2–2.5 hours or longer, it may be commonly found that it may not be possible to realize optimum yields because of pyrolysis occurring at the high temperatures over the extended period of time, and the production of large quantities of by-products, e.g., $(C_4H_9)_2SnCl_2$ together with $C_4H_9SnCl_3$, $SnCl_2$, and metallic tin inter alia.

It is an object of this invention to set forth a novel process for synthesizing organotin halides in high yields at moderate temperatures. Other objects will be apparent to those skilled in the art on inspection of the following description.

In accordance with certain of its aspects, the novel process of this invention for preparing a compound $R_eSnX_f$ comprises reacting, in the presence of a cross-alkylation catalyst, $R_aSnX_b$ with $R_cSnX_d$ wherein $a$, $b$, $c$, $d$, and $f$ may be integers from 0 to 4; the sum of $a$ and $b$, $c$ and $d$, $e$ and $f$ is each equal to 4; $c$ is equal at least to $a$ plus 2; $a$ is an integer from 0–2; $e$ is an integer from 1–3; X is halogen; and R is hydrocarbon having at least two carbon atoms selected from the group consisting of alkyl, aralkyl, cycloalkyl, aryl, and alkaryl; and withdrawing as product the compound $R_eSnX_f$.

The preferred compounds $R_aSnX_b$ which may be reacted in practice of this invention may include those wherein $a$ is an integer from 0–2, $b$ is an integer from 2–4, the sum of $a+b$ is 4, X is halogen, and R may be hydrocarbon. Preferably X may be chloride or bromide. R may typically be a hydrocarbon having at least two carbon atoms including alkyl, aralkyl, cycloalkyl, alkaryl, aryl, etc. When R is alkyl, it may be ethyl, n-propyl, i-propyl, n-butyl, i-butyl, sec-butyl, amyl, octyl, decyl, octadecyl, etc. When R is alkaryl, it may typically be tolyl, xylyl, etc. When R is cycloalkyl, it may typically be cyclohexyl, cycloheptyl, methylcyclohexyl, etc. When R is aralkyl, it may typically be benzyl, ω-phenylbutyl, etc. When R is aryl, it may typically be phenyl, naphthyl, etc.

Illustrative compounds $R_aSnX_b$ which may be used in practice of this invention may include $SnCl_4$, $RSNX_3$, and $R_2SNX_2$ compounds as follows: $SnCl_4$, n-$C_4H_9SnCl_3$, i-$C_4H_9SnCl_3$, n-$C_3H_7SnCl_3$, i-$C_3H_7SnCl_3$, n-$C_5H_{11}SnCl_3$, (n-$C_4H_9)_2SnCl_2$, (n-$C_3H_7)_2SnCl_2$, (i-$C_4H_9)_2SnCl_2$, $C_6H_5SnCl_3$ $C_6H_{11}SnCl_3$, $C_6H_5CH_2SnCl_3$, $(C_6H_{11})_2SnCl_2$, o-$CH_3C_6H_4SnCl_3$ n-$C_4H_9SnBr_3$, n-$C_3H_7SnBr_3$.

The preferred compounds $R_cSnX_d$ which may be reacted in practice of this invention may include those wherein $c$ and $d$ are integers from 0–4, the sum of which is 4, $c$ is equal at least to $a+2$, i.e., to at least 2, and X is halogen. Preferably the compounds may be purified by recrystallization or distillation or washing with solvent, e.g., acetone, xylene, heptane, etc.

It is preferred that X in $R_cSnX_d$ be the same as that in $R_aSnX_b$ and preferably chlorine. R may be hydrocarbon having at least two carbon atoms. Preferably X may be chloride or bromide. R may typically be a hydrocarbon having at least two carbon atoms including alkyl, aralkyl, cycloalkyl, alkaryl, aryl, etc. When R is alkyl, it may be ethyl, n-propyl, i-propyl, n-butyl, i-butyl, sec-butyl, amyl, octyl, decyl, octadecyl, etc. When R is alkaryl, it may typically be tolyl, xylyl, etc. When R is cycloalkyl, it may typically be cyclohexyl, cycloheptyl, methylcyclohexyl, etc. When R is aralkyl, it may typically be benzyl, ω-phenylbutyl, etc. When R is aryl, it may typically be phenyl, naphthyl, etc. It is preferred that R in $R_cSnX_d$ be the same as R in $R_aSnX_b$. It may be found that the greatest benefits of this invention may be obtained when R contains at least about three carbon atoms. The reactions wherein R contains two carbon atoms may be improved by 15%–20% by practice of this invention; the reaction wherein R may contain 3, 4, or more carbon atoms may not proceed at all under the low-to-moderate temperature and time condition of this invention unless the other techniques of this invention be employed.

Illustrative compounds $R_cSnX_d$ which may be used in practice of this invention may include $R_2SnX_2$, $R_3SnX$, and $R_4Sn$ compounds as follows: (n-$C_4H_9)_2SnCl_2$, (i-$C_4H_9)_2SnCl_2$, (n-$C_3H_7)_2SnCl_2$, (i-$C_3H_7)_2SnCl_2$, $(C_6H_5)_2SnCl_2$, $(C_6H_{11})_2SnCl_2$, $(C_6H_5CH_2)_2SnCl_2$, (o-$CH_2C_6H_4)_2SnCl_2$, (n-$C_4H_9)_2SnBr_2$, (n-$C_4H_9)_3SnCl$, (i-$C_4H_9)_3SnCl$, (n-$C_4H_9)_3SnBr$, $(C_6H_5)_3SnCl$, $(C_6H_{11})_3SnCl$, $(C_6H_5CH_2)_3SnCl$, (o-$CH_3C_6H_4)_3SnCl$, (n-$C_4H_9)_4Sn$, $(C_6H_5)_4Sn$.

In practice of the process of this invention, the reactants may be reacted to yield the desired product. The particular reactants and the ratios employed may be as follows:

$R_aSnX_b + R_cSnX_d + R_eSnX_f$, $SnX_4 + 3R_4Sn + 4R_3SnX$,
$SnX_4 + R_4Sn + 2R_2SnX_2$, $SnX_4 + 2R_3SnX + 3RSnX_2$,
$3SnX_4 + R_4Sn + 4RSnX_3$, $2SnX_4 + R_3SnX + 3RSnX_3$,
$SnX_4 + R_2SnX_2 + 2RSnX_3$, $R_2SnX_2 + R_4Sn + 2R_3SnX$,
$RSnX_3 + 2R_4Sn + 3R_3SnX$, $2RSnX_3 + R_4Sn + 3R_2SnX_2$,
$RSnX_3 + R_3SnX + 2R_2SnX_2$.

It is a feature of this invention that it may be possible to selectively convert mixtures of starting materials, e.g., $R_4Sn$ and $R_3SnCl$ to optimum yields of desired product, e.g., to high yields of either $R_3SnCl$ or to $R_2SnCl_2$, or to $RSnCl_3$. This may be effected by controlling the ratio of, e.g., $SnCl_4$ and the mixture of $R_4Sn$ and $R_3SnCl$.

There may be added to the reaction mixture a cross-alkylation catalyst, preferably in amount of 0.05–0.2, say 0.1 mole per mole of $R_aSnX_b$ present, or in amount of 0.02–0.10, say 0.05 part per part of $R_aSnX_b$ present. Typical cross-alkylation catalysts which may be employed may include a halide, preferably a chloride, selected from the group consisting of aluminum chloride, titanium tetrachloride, bismuth trichloride, ferric chloride, cobalt chloride, nickel chloride, cadmium chloride, zirconium tetrachloride, boron trifluoride etherate, mercuric chloride, cupric chloride, trifluoracetic acid, and zinc fluoride. The preferred are aluminum chloride, titanium tetrachloride, trifluoracetic acid, and ferric chloride.

Reaction may be effected by mixing the reactants together preferably in the presence of inert diluent and maintaining them at low reaction temperature, typically 0° C.–165° C., preferably 25° C.–110° C., say 100° C. for 10–180 minutes, say 30 minutes. It is a particular feature of this invention that it may be possible to attain high yields in the short times and at the low temperatures of reaction. Higher temperatures, e.g., up to 200° C.

and/or longer times may be used, but no attendant advantages may be obtained by operating at these levels.

It is a particular feature of this invention that it permits attainment of high yields of desired products at low temperatures which may be attained by use of available steam at, e.g., 100 p.s.i.g. or less. This gives obvious advantanges over the prior art techniques which require a special source of high temperature heat, e.g., electric heaters, circulating hot oil, or diphenyl ether, with accompanying special equipment. Further by operation in this manner it is possible to minimize the heating up and cooling down time and thus minimize losses which might occur due to pyrolysis, etc. Practice of this invention not only permits attainment of higher yields but also permits the carrying out of reactions which may not proceed without catalyst.

Typical inert diluent liquids in the presence of which the reaction may be carried out may typically include an inert hydrocarbon such as an aliphatic hydrocarbon, e.g., hexane, heptane, octane, etc., an aromatic hydrocarbon, e.g., benzene, toluene, xylene, etc., a cyclic aliphatic hydrocarbon, e.g., cyclohexane. When inert diluent is employed, it may be present in amount of 0.5–5.0 parts, say 1 part of diluent per part of total reaction mixture. Preferably these may be added at the end of the reaction period, with 0.1–0.4 part, say 0.2 part of water. The water may extract the catalyst, e.g., aluminum chloride thereby to remove it from the organic phase. The mixture may be filtered to remove any solid unreacted raw materials or by-products and the aqueous residue separation from the diluent-mixture. The inert liquid diluent may be separated from the desired product. This may be done by crystallization or distillation.

The products may be obtained in high purity in yields approaching stoichiometric.

Practice of this invention may be observed from the following examples wherein the parts are parts by weight unless otherwise noted.

*Example 1*

In this example which illustrates practice of the invention, 173.6 parts (0.5 mole) of tetrabutyltin, 130.3 parts (0.5 mole) of tin tetrachloride, and 6.5 parts of aluminum chloride were reacted to produce dibutyltin dichloride according to the following reaction:

$$SnCl_4 + (C_4H_9)_4Sn \xrightarrow{AlCl_3} 2(C_4H_9)_2SnCl_2$$

The reactants at room temperature were charged into the reaction vessel and the temperature rose to 100° C. over 10 minutes. The solution turned amber and vapors evolved. The temperature was maintained at about 100° C. for 6 hours.

300 parts by volume of hexane was added to the reaction mixture (which was about 90% solid) and it was then heated to reflux. The boiling solution was filtered to remove insoluble $AlCl_3$. The filtrate was chilled to 5° C. and solids recovered therefrom were rinsed with chilled hexane. 129 parts of product was obtained. The filtrate was then further cooled to −30° C. and a second crop of product (89.0 parts) was obtained. Total yield was 218 parts (72%) of dibutyltin dichloride having a melting point of: first fraction 40.0° C.–41.0° C., second fraction 36.5° C.–38.8° C., reported 43° C.

*Example 2*

In this control example, 173.6 parts of tetrabutyltin and 130.3 parts of tin tetrachloride were added to the reaction vessel at room temperature. The temperature rose from 23° C. to 100° C. in 10 minutes. No vapors were evolved. The temperature was raised to and maintained at about 100° C. for 6 hours. In contrast to the reaction mixture of Example 1, no solids were present in the reaction vessel; no solids formed on cooling to −20° C. Thus no dibutyltin dichloride was formed during this reaction without catalyst.

*Example 3*

Crude tetraphenyltin was washed with acetone and dried. 4950 parts by weight (11 moles plus 5% excess or 11.6 moles) of the washed and dried material was suspended in 7000 parts by weight of commercial hexane. 956 parts (3.67 moles) of tin tetrachloride and 47.8 parts (5% of the amount of tin tetrachloride) of aluminum chloride were added to the reaction vessel to effect the following reaction:

$$SnCl_4 + 3(C_6H_5)_4Sn \xrightarrow{AlCl_3} 4(C_6H_5)_3SnCl$$

The mixture was heated to reflux over a three hour period. The reaction mixture turned from cream color to dark as it became homogenous. Dicalite filter aid was added and the mixture filtered hot. After cooling the filtrate to 15° C., 5080 parts (87.2% yield) of crude triphenyltin chloride having a melting point of 107° C.–109° C. was obtained.

*Example 4*

$$SnCl_4 + 3(C_6H_5)_4Sn \rightarrow 4(C_6H_5)_3SnCl$$

In this example, 10.9 parts of tetraphenyltin, 2.16 parts of tin tetrachloride, 0.11 part of aluminum chloride, and 16.6 parts of Solvent 210 a commercial heptane mixture, may be charged into a reaction vessel and heated (with agitation) to reflux—pot temperature 101° C. After reflux for 3 hours, the reaction mixture may be filtered hot; the filter cake may be washed with 0.4 part of hot (100° C.) Solvent 210 and the filtrate permitted to cool slowly to 15° C. The precipitate may be filtered, washed with 0.5 part of cold Solvent 210. The filter cake may then be dried in an atmospheric drier at 50° C.–60° C. The product may be found to be 11.2 parts of triphenyltin chloride approximately 95% pure, having a M.P. of 103° C.–106° C. in yield of 87.2% based upon the tin tetrachloride.

*Example 5*

$$SnCl_4 + 3(C_2H_5)_4Sn \rightarrow 4(C_2H_5)_3SnCl$$

In this example, 141 parts of tetraethyltin, 52.1 parts of tin tetrachloride, and 2.6 parts of anhydrous aluminum chloride were charged to a reaction vessel. The mixture turned dark and the temperature rose to about 100° C. over about one hour. The reaction mixture was maintained at that temperature for about 3 hours more. The reaction mixture was then vacuum distilled over a period of 90 minutes at a pot temperature of 65° C.–70° C. and a head temperature of 28° C.–66° C. at 1.7–1.9 mm. Hg. The cut taken at 62.5° C.–66° C./1.8 mm. Hg was 172.4 parts of a water-white liquid triethyltin chloride in 89.3% yield.

*Example 6*

In this control example, 141 parts of tetraethyltin and 52.1 parts of tin tetrachloride were charged to a reaction vessel. The mixture showed no change and there was no exotherm observed. The reaction mixture was heated to and maintained at about 100° C. for about 3 hours. The reaction mixture was then vacuum distilled over a period of about 4 hours at a pot temperature of 56° C.–72° C., head temperature of 46.5° C.–66° C., and vacuum of 1.3–1.8 mm. Hg. Three cuts were taken and found to be as follows:

| | Weight | B.P. |
|---|---|---|
| 1. $(C_2H_5)_4Sn$ | 22.3 | 56° C.–63° C./1.3–1.6 mm. |
| 2. $(C_2H_5)_3SnCl$ | 138.0 | 68° C.–72° C./1.7 mm. |
| 3. $(C_2H_5)_2SnCl_2$ | 26.0 | residue. |

The yield of triethyltin chloride was 71.5%.

From a comparison of Examples 5 and 6, it will be apparent that it may be possible to significantly increase the yield of triethyltin chloride by e.g. 17.8% from 71.5% to 89.3%.

Example 7

$$SnCl_4 + 3(i\text{---}C_3H_7)_4Sn \rightarrow 4(i\text{---}C_3H_7)_3SnCl$$

In this example 45.8 parts of tetra-isopropyltin, 13.7 parts of tin tetrachloride, and 0.7 part of anhydrous aluminum chloride were charged to a reaction vessel. The reaction mixture became yellowish as it was stirred. It was maintained at about 100° C. for 48 hours. It was then allowed to cool to room temperature under nitrogen and filtered. The filter cake was washed with 70 parts of hexane and the wash combined with the filtrate. 40 parts of water was added to remove aluminum chloride. The aqueous layer was separated and the hydrocarbon layer was distilled through a Vigreaux column. 37.9 parts of a distillate was obtained at 134–137.5/1.0 mm. Hg corresponding to 84.1% yield.

In a series of examples to demonstrate the operability of the various catalysts which may be employed in the production of the typical triphenyltin chloride, 42.4 parts of tetraphenyltin, 10.9 parts of tin tetrachloride, and 0.54 part of catalyst were stirred in a reaction vessel for 3 hours at 100° C. Xylene (90 parts) was then added to the reaction vessel. When the catalyst was reported to be soluble in xylene (Examples 8, 9, 10 and 11) 12.5 parts of water were added.

The reaction mixture was filtered to remove unreacted tetraphenyltin and a catalyst residue, e.g., an aluminum containing compound in the case of $AlCl_3$ catalyst. The water was separated. The xylene was stripped off and the product poured into a Pyrex dish to solidify. In this comparative series of experiments, the product was examined. The desired triphenyltin chloride had a M.P. of 105° C.–106° C. All the following catalysts gave products which were satisfactory:

| Example: | Catalyst |
|---|---|
| 8 | $TiCl_4$ |
| 9 | $CdCl_2$ |
| 10 | $FeCl_3$ |
| 11 | $BiCl_3$ |
| 12 | $ZrCl_4$ |

It is a particular feature of this invention, according to certain of its aspects, that it permits the production of crude mixtures which contain unexpectedly high porportions of desired products; and that the crude unseparated mixtures can be readily converted to high yields of desired end-products. For example in the prior art commercial reaction intended to give the highest yields of $R_3SnCl$, typically tributyltin chloride, the distribution of products obtained from the prior art reaction of tetrabutyltin and tin tetrachloride may be 85%–87% $R_3SnCl$, 6%–8% $R_4Sn$, and 6%–8% $R_2SnCl_2$.

Reaction of a crude mixture with the stoichiometric amount of tin tetrachloride and subsequent reaction with caustic, e.g., sodium hydroxide, may produce without catalyst a mixture containing, e.g., 53.7% bis(tri-n-butyltin) oxide, 40.82% tetrabutyltin, and 4.75% dibutyltin oxide. By practice of this invention, it is possible to produce a so-called crude mixture which may permit attainment of a product containing more thon 90% bis (tri-n-butyltin)oxide, nominal amounts, i.e., less than 10% of tetrabutyltin, and little or no dibutyltin oxide.

Thus, it is a feature of this aspect of the invention that one mole of $SnX_4$, typically tin tetrachloride, may be reacted with three moles of $R_4Sn$, typically tetrabutyltin, in the presence of a cross-alkylation catalyst, typically aluminum chloride, and preferably also in the presence of inert hydrocarbon diluent, to produce a reaction mixture containing $R_3SnX$, typically tributyltin chloride; that the reaction mixture may be separated from the catalyst as by water extraction; that the so-recovered reaction mixture may be causticized, i.e., reacted preferably with the amount of aqueous caustic soda stoichiometrically equivalent at least to the $R_3SnX$, thereby forming $R_3SnOSnR_3$, typically bis(tri-n-butyltin)oxide; and recovering said $R_3SnOSnR_3$ from said reaction mixture, as by distillation after the aqueous caustic soda has been removed.

Example 13

In a typical example of this aspect of the invention, 347 parts (1 mole) of tetrabutyltin and 87 parts (0.38 mole) of tin tetrachloride, and 4.3 parts (0.033 mole) of aluminum chloride were mixed together and allowed to remain at room temperature for 7 hours. 400 parts of cyclohexane and 100 parts of water were added to the reaction mixture which was then filtered. The phases of the clear filtrate were separated and the organic phase was treated with 320 parts of 25% aqueous solution of sodium hydroxide and heated to about 80° C. for 1 hour to convert the tributyltin chloride to bis(tri-n-butyltin) oxide by the following reaction:

$$2(C_4H_9)_3SnCl + 2NaOH \rightarrow [(C_4H_9)_3Sn]_2O + H_2O$$

The organic layer was separated and filtered. The clear filtrate was stripped of hexane at reduced pressure to about 40 mm. Hg by heating to a final pot temperature of about 100° C. The hexane-free residue was found to contain 93.4% by weight of bis(tri-n-butyltin) oxide, 6.7% unreacted tetrabutyltin, and no dibutyltin oxide. The bis(tri-n-butyltin)oxide was recovered in 92.05% yield from the tetrabutyltin by distillation.

Example 14

In this example, the procedure of the prior example was followed except that the reaction was run at 100° C. for 3 hours instead of at room temperature for 7 hours. The residue was found to be 93.5% bis(tri-n-butyltin) oxide, 6.5% tetrabutyltin, and no dibutyltin oxide. The bis(tri-n-butyltin)oxide was obtained in 98% yield.

Example 15

$$(C_6H_5)_2SnCl_2 + (C_6H_5)_4Sn \rightarrow 2(C_6H_5)_3SnCl$$

A solution of diphenyltin dichloride in heptane was analyzed and found to contain 19.2% diphenyltin dichloride. To 1857 parts by weight of this solution (containing 365 parts or 1.035 moles of diphenyltin dichloride) was added 442 parts (1.035 moles) of tetraphenyltin and 12.5 parts of anhydrous aluminum chloride. The mixture was mechanically stirred and maintained at reflux temperature (98° C.) for 3 hours. Then it was filtered hot. When the clarified solution was cooled to 24° C., triphenyltin chloride was thrown out of solution forming a slurry. The triphenyltin chloride was filtered out of the slurry, washed with heptane, and dried. The product had a melting point of 101.4° C.–105° C. The yield was 685 parts (1.78 moles) or 86% of theory. The product analyzed: 95.1% $(C_6H_5)_3SnCl$, 1.91% $(C_6H_5)_2SnCl_2$, 2.98% $(C_6H_5)_4Sn$.

Example 16

$$(C_4H_9)_3SnCl + C_4H_9SnCl_3 \rightarrow 2(C_4H_9)_2SnCl_2$$

To a mixture of equimolar proportions of tributyltin chloride (163 parts) and butyltin trichloride (141 parts) may be added 6.5 parts of anhydrous aluminum chloride and the mixture held at about 100° C. for 4 hours. When cooled, the mass becomes almost completely solid and, upon recrystallization from hexane, dibutyltin dichloride may be recovered.

When this reaction is repeated, omitting only the anhydrous aluminum chloride, no solid product is recovered when the reaction mass is cooled, indicating that no appreciable amount of dibutyltin dichloride is produced.

Example 17

$$3(C_6H_5)_4Sn + SnCl_4 \rightarrow 4(C_6H_5)_3SnCl$$

Into a reaction vessel equipped with a stirrer, reflux condenser and means for heating, were charged 40.7 parts (0.156 mole) of tin tetrachloride, 210 parts (0.492 mole—5% excess over stoichiometric) of tetraphenyltin, 2.05 parts of anhydrous aluminum chloride, and 350 parts of cyclohexane. The mixture was stirred, heated to reflux (84° C.) and maintained at reflux for 15 minutes. The reaction mixture was then filtered hot through a heated filter to remove 40.5 parts of insolubles, primarily unreacted tetraphenyltin. Upon cooling the clear filtrate, white crystals, were thrown down which were filtered off and air dried. There were thus recovered 191 parts of product which melted at 102.4° C.–103.4° C. and which was found by analysis to contain 94% triphenyltin chloride. Based upon the amount of tin tetrachloride charged, the yield of triphenyltin chloride was 75%, an unexpectedly high yield for this short reaction time. A small amount of triphenyltin chloride was also found to be present in the final mother liquor.

*Example 18*

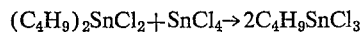
$(C_4H_9)_2SnCl_2 + SnCl_4 \rightarrow 2C_4H_9SnCl_3$

A reaction mixture containing 304 parts (1 mole) of di-n-butyltin dichloride, 260 parts (1 mole) of tin tetrachloride and 13 parts of aluminum chloride was maintained at reflux temperature (pot 145° C., head 115° C.) for about 4 hours. Upon distillation of the finished reaction mixture 90 parts (0.32 mole) of n-butyltin trichloride was recovered.

When the reaction was attempted under the same conditions, but without catalyst, no butyltin trichloride at all was produced.

*Example 19*

427 parts (1 mole) of tetraphenyltin are mixed with 260 parts (1 mole) of tin tetrachloride and 13 parts of anhydrous aluminum chloride in a reaction vessel equipped with a reflux condenser. The mixture is warmed gently to 60° C.–80° C. until it liquifies, then is further heated to about 100° C. and held at this temperature for about one hour. Upon cooling most of the mass solidifies. Water (100 parts) and toluene (500 parts) are added, and the mixture heated. The resulting cloudy solution is filtered. The aqueous phase is separated and the organic phase is stripped of toluene to yield diphenyltin dichloride.

*Example 20*

$(C_4H_9)_4Sn + 2C_4H_9SnCl_3 \rightarrow 3(C_4H_9)_2SnCl_2$

Into a reaction vessel were charged 69.4 parts (0.2 mole) of tetrabutyltin, 112.8 parts (0.4 mole) of butyltin trichloride and 2.8 parts of anhydrous aluminum chloride. The mixture was held at about 100° C. for hours, then allowed to cool; it became almost solid. From this mass relatively pure dibutyltin dichloride (M.P. 38.5° C.–41.5° C.) was recovered by recrystallization from hexane.

*Example 21*

$(C_4H_9)_4Sn + (C_4H_9)_2SnCl_2 \rightarrow 2(C_4H_9)_3SnCl$

Into a reaction vessel was charged 325 parts (1 mole) of tetra-n-butyltin, 304 parts (1 mole) of di-n-butyltin trichloride and 15 parts of aluminum chloride. The mixture was maintained at 100° C. for 1½ hours.

Then a sample withdrawn from the body of the reaction mixture was dissolved in cyclohexane, the solution then being washed with water. The organic phase was separated and stripped of solvent. Analysis of the stripped product showed that the reaction had gone 88% to completion in 1½ hours.

The balance of the reaction mixture was held at 100° C. for an additional 1½ hours with further formation of tri-n-butyltin chloride.

When this reaction was duplicated, except that aluminum chloride was omitted from the reaction mixture analysis of the product indicated only 6% completion of the reaction after 3 hours.

*Example 22*

$2(C_4H_9)_4Sn + C_4H_9SnCl_3 \rightarrow 3(C_4H_9)_3SnCl$

A reaction mixture consisting of 278 parts of tetra-n-butyltin (0.8 mole), 113 parts of n-butyltin trichloride (0.4 mole), and 5.6 parts of aluminum chloride was maintained at 100° C. for 3 hours. Then the reaction mixture was dissolved in 225 parts of cyclohexane and the solution was washed with 400 parts of water. The organic phase was separated, dried, filtered, and stripped of solvent under vacuum. There were recovered 382 parts of tri-n-butyltin chloride of about 92% purity, indicating a yield of 90% of theory.

When this reaction was duplicated, except that aluminum chloride was omitted from the reaction mixture, the yield of tri-n-butyltin chloride was low and the product contained 28.2% of di-n-butyltin dichloride together with about 30% unreacted tetra-n-butyltin.

Although this invention has been described with reference to specific examples, it will be apparent to those skilled in the art that various modifications may be made thereto which fall within the scope of this invention.

I claim:
1. The process for preparing a compound $R_eSnX_f$ which comprises reacting in the presence of a cross-alkylation catalyst $R_aSnX_b$ with $R_cSnX_d$ wherein $a$, $b$, $c$, $d$, and $f$ are integers; the sum of $a$ and $b$, $c$ and $d$, and $e$ and $f$ is each equal to 4: $c$ is equal to at least to $a$ plus 2; $a$ is an integer from 0 to 2; $e$ is an integer from 1 to 3; X is halogen; and R is hydrocarbon selected from the group consisting of alkyl, aralkyl, cycloalkyl, aryl, and alkaryl; and withdrawing as product from the reaction mixture the compound $R_eSnX_f$.

2. The process of claim 1 wherein said reactants are reacted at temperature of 0° C.–165° C.

3. The process of claim 2 wherein said reactants are reacted for 10–180 minutes.

4. The process of claim 1 wherein $R_aSnX_b$ is $SnX_4$.

5. The process of claim 1 wherein $R_cSnX_d$ is $R_4Sn$.

6. The process of claim 1 wherein said cross-alkylation catalyst is selected from the group consisting of aluminum chloride, titanium tetrachloride, bismuth trichloride, ferric chloride, cobalt chloride, nickel chloride, cadmium chloride, zirconium tetrachloride, boron trifluoride etherate, mercuric chloride, cupric chloride, trifluoroacetic acid, and zinc fluoride.

7. The process of claim 1 wherein said cross-alkylation catalyst is aluminum chloride.

8. The process of claim 1 wherein said product is extracted from the reaction mixture by inert diluent liquid hydrocarbon.

9. The process of claim 8 wherein said inert diluent liquid hydrocarbon is heptane.

10. The process for preparing a compound $R_3SnX$ which comprises reacting in the presence of a cross-alkylation catalyst $SnX_4$ with $R_4Sn$ wherein X is halogen and R is hydrocarbon selected from the group consisting of alkyl, aralkyl, cycloalkyl, aryl, and alkaryl; maintaining the mole ratio of $SnX_4:R_4Sn$ of 1:3; and withdrawing as product from the reaction mixture the compound $R_3SnX$.

11. The process of claim 10 wherein said reactants are reacted at temperature of 0° C.–165° C.

12. The process of claim 11 wherein said reactants are reacted for 10–180 minutes.

13. The process of claim 10 wherein said cross-alkylation catalyst is aluminum chloride.

14. The process for preparing triphenyltin chloride which comprises reacting one mole of tin tetrachloride with 3 moles of tetraphenyltin in the presence of a cross-alkylation catalyst, and withdrawing triphenyltin chloride from the reaction mixture.

15. The process for preparing triphenyltin chloride as claimed in claim 14 wherein said reactants are reacted at temperature of 25° C.–110° C.

16. The process for preparing triphenyltin chloride as claimed in claim 14 wherein said reactants are reacted for 10–180 minutes.

17. The process for preparing dibutyltin dichloride which comprises reacting one mole of tin tetrachloride with one mole of tetrabutyltin in the presence of a cross-alkylation catalyst, and withdrawing dibutyltin dichloride from the reaction mixture.

18. The process for preparing dibutyltin dichloride as claimed in claim 17 wherein said reactants are reacted at temperature of 25° C.–110° C.

19. The process for preparing dibutyltin dichloride as claimed in claim 17 wherein said reactants are reacted for 10–180 minutes.

20. The process for preparing dibutyltin dichloride as claimed in claim 17 wherein said cross-alkylation catalyst is aluminum chloride.

21. The process which comprises reacting in the presence of a cross-alkylation catalyst one mole of $SnX_4$ with three moles of $R_4Sn$ to produce a reaction mixture containing $R_3SnX$ wherein R is hydrocarbon selected from the group consisting of alkyl, aralkyl, cycloalkyl, aryl, and alkaryl, and X is halide; separating said reaction mixture from said catalyst; causticizing said reaction mixture thereby forming $R_3SnOSnR_3$, and recovering said $R_3SnOSnR_3$ from said reaction mixture.

22. The process which comprises reacting in the presence of a cross-alkylation catalyst one mole of tin tetrachloride with three moles of tetrabutyltin thereby forming a reaction mixture containing tributyltin chloride, separating said reaction mixture from said catalyst, causticizing said reaction mixture thereby forming bis(tri-n-butyltin)oxide, and recovering said bis(tri-n-butyltin)oxide from said reaction mixture.

23. The process which comprises reacting in the presence of a cross-alkylation catalyst $SnX_4$ witr $R_2SnX_2$ wherein X is halogen and R is hydrocarbon selected from the group consisting of alkyl, aralkyl, cycloalkyl, aryl, and alkaryl; maintaining a 1:1 mole ratio of $SnX_4:R_2SnX_2$; and withdrawing as product from the reaction mixture the compound $RSnX_3$.

24. The process which comprises reacting in the presence of a cross-alkylation catalyst $SnCl_4$ with dibutyltin dichloride; maintaining a 1:1 mole ratio of tin tetrachloride to dibutyltin dichloride; and withdrawing as product from the reaction mixture the compound butyltin trichloride.

References Cited by the Examiner

UNITED STATES PATENTS 3,082,230    3/1963    Dorfelt _____ 260—429.7

FOREIGN PATENTS 710,224    6/1954    Great Britain.

OTHER REFERENCES

Calingaert et al.: J.A.C.S., vol. 61, pp. 2748–2754 (1939).

Ingham et al.: Chem. Reviews, vol. 60, No. 5, October 1960, pp. 485 and 486.

TOBIAS E. LEVOW, *Primary Examiner.*

E. C. BARTLETT, W. F. W. BELLAMY,
*Assistant Examiners.*